(12) United States Patent
Sassi et al.

(10) Patent No.: US 7,974,990 B2
(45) Date of Patent: Jul. 5, 2011

(54) MANAGING PROGRAM APPLICATIONS

(75) Inventors: Abdessattar Sassi, San Jose, CA (US); Denis Demandolx, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 10/621,795

(22) Filed: Jul. 16, 2003

(65) Prior Publication Data

US 2005/0015387 A1    Jan. 20, 2005

(51) Int. Cl.
  G06F 7/00   (2006.01)
  G06F 17/30  (2006.01)
  G06F 9/44   (2006.01)
(52) U.S. Cl. .................. 707/792; 707/899; 717/163
(58) Field of Classification Search .............. 707/3, 899, 707/792, 999.003; 717/162–167
See application file for complete search history.

(56) References Cited

U.S. PATENT DOCUMENTS

| | | | |
|---|---|---|---|
| 6,615,166 B1 * | 9/2003 | Guheen et al. ........... | 703/27 |
| 6,643,683 B1 * | 11/2003 | Drumm et al. ........... | 709/203 |
| 6,865,732 B1 * | 3/2005 | Morgan ................... | 717/140 |
| 2002/0035626 A1 | 3/2002 | Higuchi | |
| 2004/0049737 A1 * | 3/2004 | Hunt et al. ............... | 715/513 |
| 2004/0120473 A1 * | 6/2004 | Birch et al. .............. | 379/88.17 |
| 2004/0120500 A1 * | 6/2004 | Hinderberger ............ | 379/230 |
| 2004/0225650 A1 * | 11/2004 | Cooper et al. ........... | 707/3 |

FOREIGN PATENT DOCUMENTS

| | | |
|---|---|---|
| EP | 0973297 A2 | 1/2000 |
| EP | 0984585 A2 | 3/2000 |

OTHER PUBLICATIONS

Interim Guidelines for Examination of Patent Applications for Patent Subject Matter Eligibility; Annex IV; pp. 50-57; Nov. 22, 2005.*
Sakir Yucel, et al. "Multimedia QoS Service and Management Architecture Using CORBA/Java Platform" Annual Review of Communications, National Engineering Consortium 1998.
European Search Report, Application No. EP 04254105 Search Completion Date: Jun. 29, 2005.

* cited by examiner

Primary Examiner — Kimberly Lovel

(57) ABSTRACT

Techniques for managing program applications include an application being managed having an object-oriented interface with objects having data and methods to change the data. Changing these objects and/or the data of the objects changes the outcome of the application. A hyper-text transfer protocol (HTTP) server, a server-side script engine, and a scheduling mechanism are embedded in the application, i.e., they are made part of, and therefore run on, the same programming process as the application. Tasks to be performed by the application, the HTTP server, and the script engine are scheduled. The HTTP server processes requests of HTTP clients, typically supplied via a Web browser, and forwards them to the script engine. The script engine, which has direct access to the application objects, interacts with the application being controlled. The HTTP server runs the script engine for the requested script and formats the resulting information being returned to the client.

15 Claims, 4 Drawing Sheets

MANAGING PROGRAM APPLICATIONS

FIELD OF THE INVENTION

The present invention relates generally to program applications and, more specifically, to managing those applications.

BACKGROUND OF THE INVENTION

In one approach of programming management, the Simple Network Management Protocol (SNMP), which enables client/server relationships, allows a manager console to manage a remote network device, through a User Datagram Protocol/Internet Protocol (UDP/IP) network. Typically, the client application is referred to as the network manager, and an application program residing and running on the remote network device is referred to as the SNMP agent, which generates information about the device, organizes the information in a database referred to as the MIB (Management Information Base), maintains the MIB, answers the request of the manager, etc. The SNMP protocol also defines primitives to get and set properties of program object instances as defined in the MIB. However, both the agent and the manager must implement the full SNMP protocol, and the agent must store and retrieve management data as defined by the MIB. Even though SNMP primitives allow the manager to get and set properties of object instances defined in the MIB, it is not possible to run object methods and perform actions on the managed system. Further, the approach requires additional and specific software to equip the SNMP management with a graphic-user interface (GUI) on the manager side.

A common-gateway-interface (CGI) program allows users to control applications on a system hosting an HTTP server. Therefore, an HTTP client, via the CGI program, can interact with the application to be controlled on the server. Unfortunately, CGI-based programs are difficult to develop, require lots of overheads, and do not maintain persistent data across client requests, multiple clients, multiple applications, etc. In terms of performance, portability, extensibility, and maintainability, etc., the traditional CGI approach is also inferior to web applications run by application servers.

Some approaches allow server pages to communicate with external common-object-request-broker architecture (CORBA) or COM objects provided by an application. However, these approaches require the embedment of CORBA/COM infrastructure in the application system. Their complex nature, along with the incompatibility between different implementations, prevents their adoption for performance-critical and real-time processes or for managing embedded applications, which are typically "light-weighted," e.g., designed to work with limited system resources such as memory, processor power, input/output interfaces, etc. For use in the network elements, CORBA is known to be too slow, too unpredictable, and too big.

Another approach includes management tools that are based on GUIs and use management protocol like CORBA-based management wherein each management request is translated into a remote invocation of a management procedure via message passing. The management request processed by the management server produces a message of the format expected by the GUI client application. However, in addition to the disadvantages of using CORBA as mentioned above, this approach is less open and often ends with proprietary message formats or remote procedures.

Based on the foregoing, it is desirable that mechanisms be provided to solve the above deficiencies and related problems.

SUMMARY OF THE INVENTION

The present invention provides techniques for managing program applications. In an embodiment, an application to be managed has an object-oriented interface that includes objects having data and procedures or methods to change the data. Changing these objects and/or the data of the objects changes the outcome of the application.

A hyper-text transfer protocol (HTTP) server, a server-side script engine, and a scheduler are embedded in the application. That is, they are made part of, and therefore run on, the same programming process as the application. The scheduler schedules tasks to be performed by the application, the HTTP server, and the script engine. The HTTP server processes requests of HTTP clients or management terminal and forwards them to the script engine. The script engine, which has direct access to the application objects, can interact with the application to be managed. Typically, a user, through a web browser, connects to the HTTP server and loads the server script that passes program parameters within the underlying HTTP request. The HTTP server runs the script engine for the requested script, which accesses application data, manages its objects, performs action, retrieves data, formats the resulting information to be returned to the user interface, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

OVERVIEW

Figure 1:
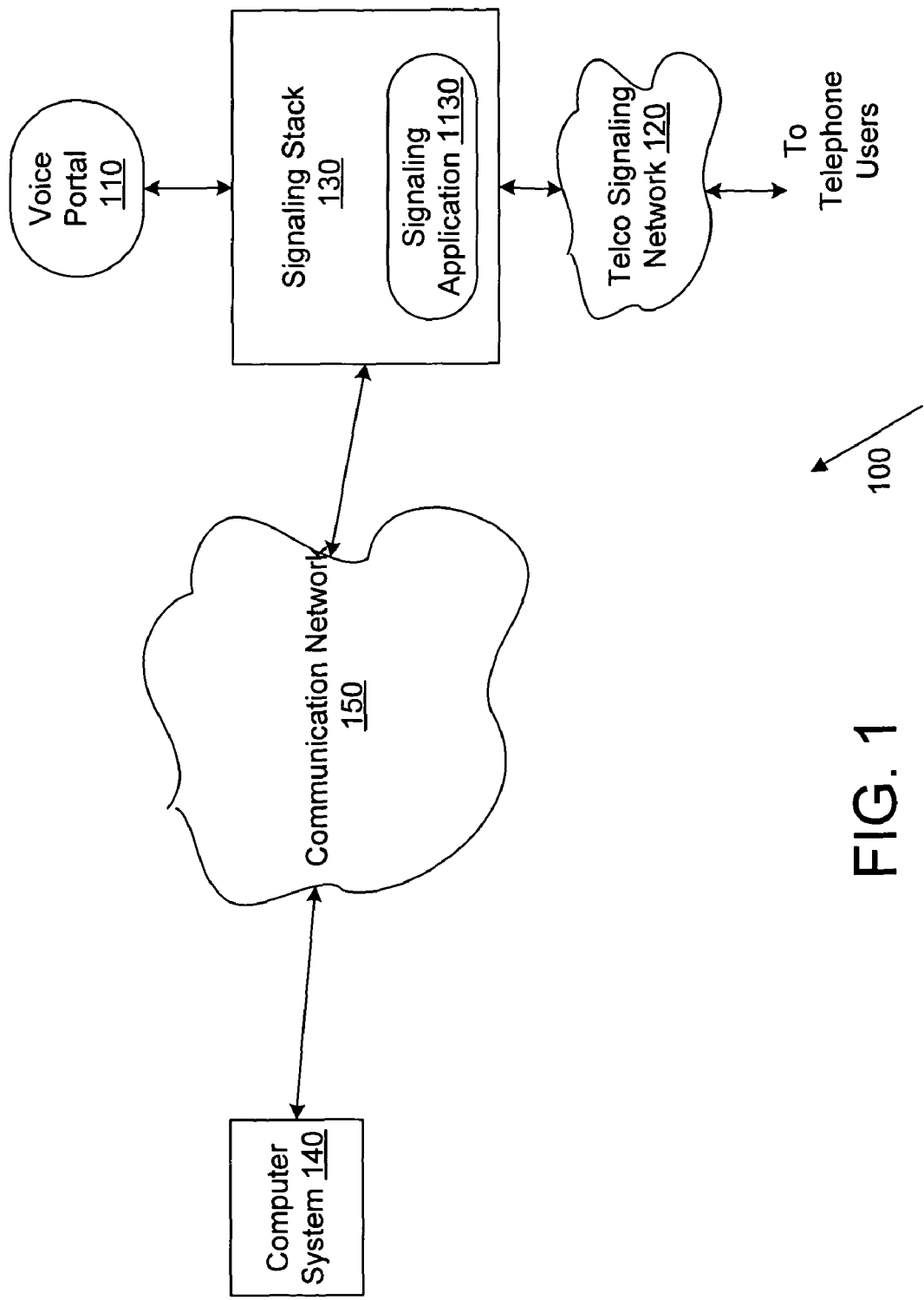
FIG. 1 shows a telecommunication network upon which embodiments of the invention may be implemented.

FIG. 1 shows an example of a telecommunication network 100 upon which embodiments of the invention may be implemented. For illustration purposes, this example shows the implementation of a voice portal solution.

Voice portal application 110 is a service that offers telephone users a natural-language interface to access and retrieve web or web-like resources and services such as email, news, financial services, etc.

Telco signaling network 120 generally includes network elements such as switches, routers, etc., and their corresponding communication protocols, that manage telephone connections between telephone users and voice portal application 110.

Signaling stack 130 includes hardware and software that process signaling applications between signaling network 120 and voice portal 110. In an embodiment, stack 130 uses the Signal System 7 (SS7) protocol defined by the International Telecommunication Union (ITU) to manage data traffic. The SS7 network and protocol are normally used for efficient and secure telecommunications, wireless services such as personal communication services (PCS), wireless roaming, mobile-subscriber authentication, call setup, management, etc. For illustration purposes, the software application running on signaling stack 130 is referred to as signaling application 1130, and, in the example of FIG. 1, is also referred to as the application to be managed, monitored, controlled, etc.

An operator uses computer system 140, such as a PC, a MAC, a workstation, etc., that is equipped with an HTTP client to manage objects of application 1130, monitor and update the SS7 parameters, etc. Normally, the operator uses a web browser, and thus the extensible markup language (XML) or the hyper-text markup language (HTML) to communicate between computer system 140 and manage signaling application 1130. However, other software tools using a different language may be used in place of the web browser such as the OpenView Network Manager or similar management applications. Communication link or communication network 150 is mechanisms for communicating between computer 140 and stack 130. Communication link 150 may be a single network or a combination of networks that utilizes one or a combination of communication protocols such as the Local Area Network (LAN), the Wireless LAN (WLAN), the Transmission Control Protocol/Internet Protocol (TCP/IP), the Public Switched Telephone Network (PSTN), the Digital Subscriber Lines (DSL), the cable network, the satellite-compliant, the wireless-compliant, the Internet, etc. Examples of a communication link include network media, interconnection fabrics, rings, crossbars, etc. A computer system may use a communication link different from that of another computer system. In FIG. 1, the Internet is used as an example as communication link 150. However, techniques of the invention are applicable to the Intranet, the Extranet, other networks and their equivalence. In general, Intranets refer to networks that are for use by employees of a corporation, and Extranets refer to networks that are for use by employees of different corporations. The invention is not limited to a particular type of network.

The Signaling Application

Figure 2:
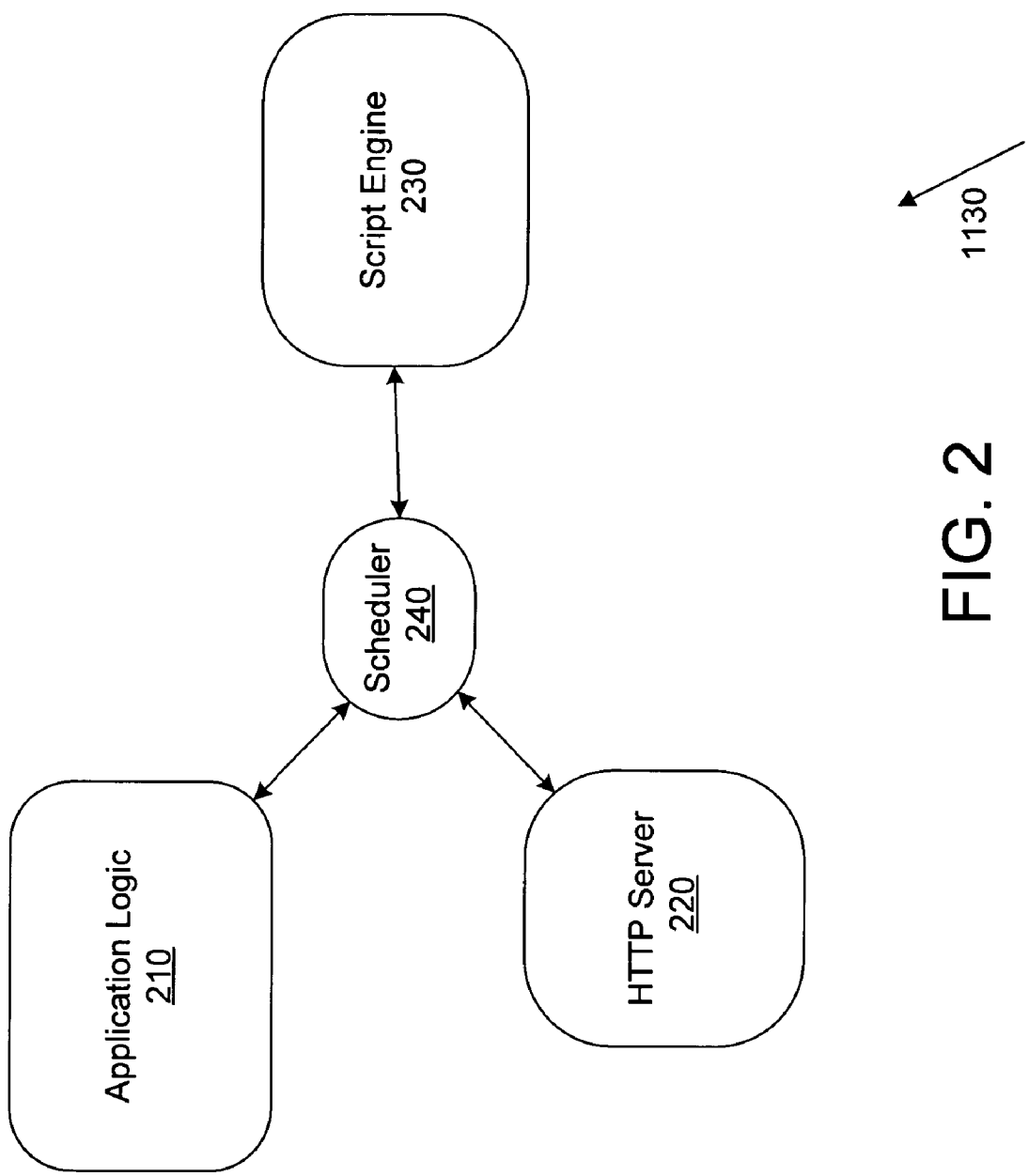
FIG. 2 shows a signaling application of the network in FIG. 1, in accordance with an embodiment.

FIG. 2 shows signaling application to be managed 1130 that includes application logic 210, HTTP server 220, script engine 230, and scheduler 240, in accordance with an embodiment.

Signaling application 1130 is written in the object-oriented language such as C++, Java, etc., and includes various programming objects, which are self-contained entities that include both data and procedures or methods to manipulate the data. These objects provide an object-oriented representation of application 1130. Application 1130, through its objects, handles calls between customers and voice portal application 110. For illustration purposes, objects handling telecommunication for system 100 are referred to as application logic 210. Usually, updating and/or changing objects in signaling application 1130 desires a quick response of, e.g., less than 100 ms, and therefore application logic 210 has higher priority in receiving system resources than HTTP server 220 and script engine 230. Examples of objects of signaling application 1130 include ISDN User Part (ISUP), distributed ISUP (DISUP), destination point code (DPC), circuit identification code (CIC), object representation of voice portal applications, which are services running on voice portal 110, etc. A DISUP communicates with multiple voice portal applications, each of which is connected to signaling network 120 that processes calls from the network through a set of DPC. Accessing the SS7 network is through point code virtual address. Each call is defined by the corresponding DPC and CIC. Each voice portal application in signaling application 1130 processes the call traffic for the given set of DPC and CIC. Each client uses one or a plurality of switches in their telephone conversation, and each switch handles a number of physical lines identified by a CIC. A trunk or a communication channel between two points corresponds to a physical line having a CIC. Network 100 may connect to 200,000 lines and thus is associated with 200,000 CICs. Data for objects of signaling application 1130 may be seen on a display screen, e.g., of computer 140, using the HTML or XML. In an embodiment, clicking on a voice portal application causes displays of information related to the DPC, the CIC, etc., for that application.

HTTP server 220 and script engine 230 may be referred to as "embedded" in signaling application 1130. That is, signaling application 1130, HTTP server 220, and script engine 230 are made part of a program running on a process, and because they run on the same process, they share various libraries. Consequently, HTTP server 220 and script engine 230 have access to objects of application logic 210. In an embodiment, embedding HTTP server 220 and script engine 230 in application 1130 is done at compile time wherein the compiler links various libraries, such as static, archive, shared, dynamic libraries, etc., of signaling application 1130, HTTP server 220, script engine 230, etc.

HTTP server 220 is responsible for handling management interactions between computer 140 and application 1130. Examples of these interactions include HTTP-related tasks such as processing requests and responses from and to the HTTP client or management interface of computer 140. For example, HTTP server 220 uses the HTTP protocol to define how messages are formatted and transmitted. In response to HTTP requests from client 140, HTTP server 220 loads the scripts to be executed by script engine 230. In the embodiment of FIG. 2, HTTP server 220 delivers the document content employed by the web browser such as the XML and/or HTML. However, if another software tool working with another content type is used in place of the web browser, then another server, instead of the HTTP server, will be used to produce that content.

Script engine 230 interprets and executes program scripts. In various situations, HTTP server 220 may invoke script engine 230 to interpret a script. Generally, a program script is a macro, a batch file, etc., which are stored in a disk and have a list of commands that can be executed without human interaction. When scripts are executed, they have access to the objects of application logic 210 because script engine 230 includes an application programming interface (API) to enrich its built-in objects and define/create additional objects. Script engine 230 thus includes objects reflecting actual objects of the application to be managed 1130 and are available within the script program. Via these objects and the server-side scripts that use these objects, managing signaling application 1130 is possible. Script engine 230, having the output of the script execution, returns it to the HTTP client interface between HTTP server 220 and client system 140.

In an embodiment, the customers themselves may generate scripts that monitor and/or affect signaling application 1130 without having to recompile any part of application 1130. This is advantageous over other approaches in which the customers would need authorization from the manufacturer of signaling application 1130 to affect such application. Further, script engine 230 provides a C/C++ language interface to define customized objects, methods and properties, which are also available in scripts and which depict the application to be managed 1130.

Examples of program scripts include listing a number of trunks that are being used in the system, explicitly closing a connection between the computer running portal application 110 and signaling application 1130, getting properties of a voice portal application, identifying circuits managed by an application, resetting a circuit, a range of circuits, a set of circuits, querying the state of a circuit, getting traffic statistics, etc.

Scheduler 240 schedules tasks to be performed by application logic 210, HTTP server 220, script engine 230, etc. In an embodiment, scheduler 240 is also embedded in application 1130 and is implemented in an infinite loop and regularly checks whether application logic 210 and HTTP server 220 has tasks to perform. If either one of them is not performing a task, then scheduler 240, based on the priority, assigns tasks to them. Tasks for application logic 210 include, for example, calls processing, and tasks for HTTP server 220 include new and/or existing HTTP requests, etc. In general, scheduler 240 minimizes the impact on application logic 210, and thus gives higher priority to application logic 210 than HTTP server 220 and script engine 230 in using system resources. Scheduler 240 thus allows application processing to be executed before executing management requests. During the process, scheduler 240 may divide tasks of HTTP server 220 and/or script engine 230 into smaller tasks for them to be executed in several small steps. For example, if an HTTP request takes up to 2 seconds to process, then scheduler 240 may divide and thus execute the request in 100 ms-second subtasks. Similarly, a request may be for 10,000 circuits, scheduler 240 then schedules work to be performed on 100 circuits each time, etc.

Method Illustrating a Method for Managing Objects of Signaling Application 1130

Figure 3:
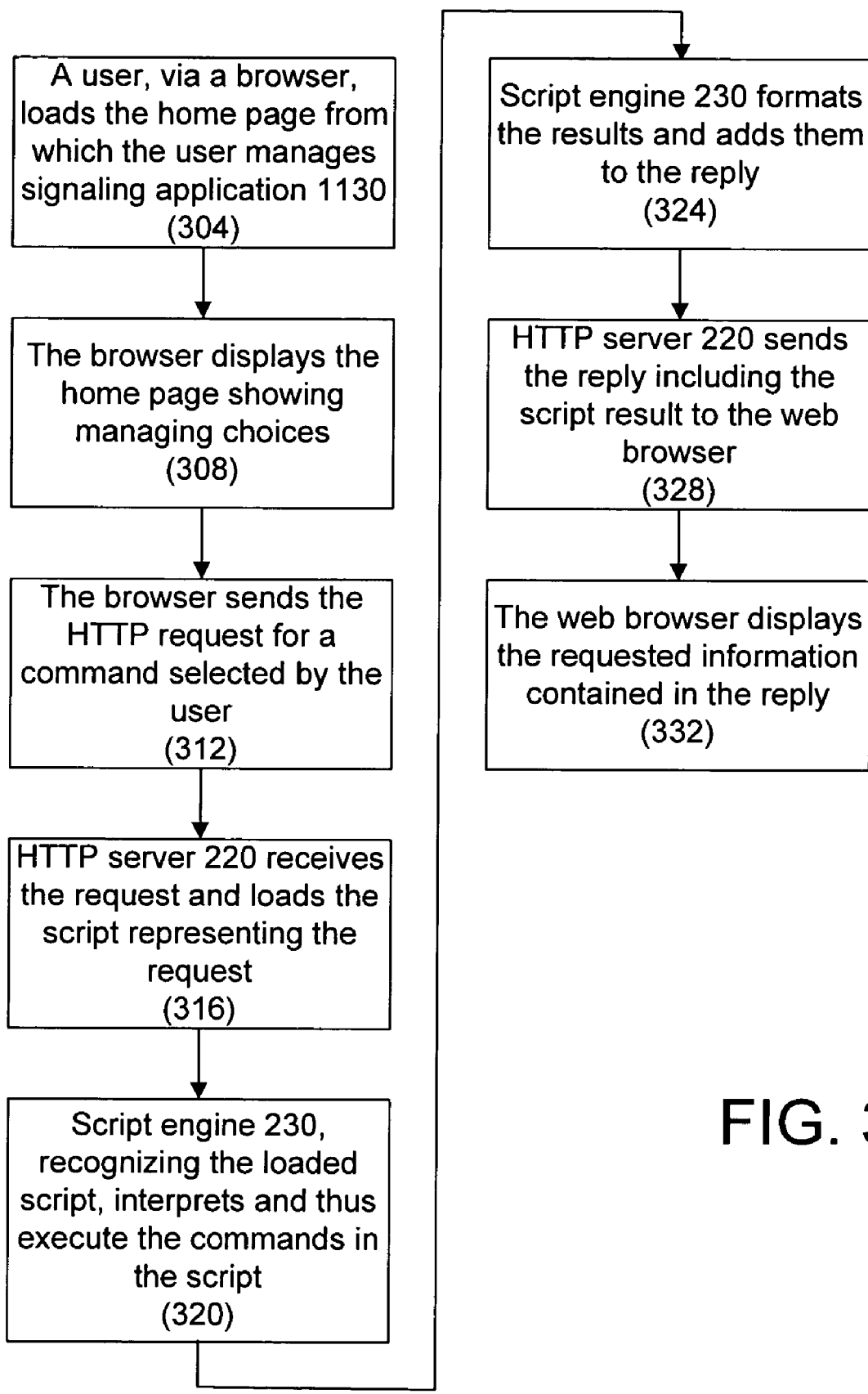
FIG. 3 is a flowchart illustrating how to manage the signaling application in FIG. 2, in accordance with an embodiment.

FIG. 3 is a flowchart illustrating how to manage objects of signaling application 1130, in accordance with an embodiment.

In step 304, a user, from a web browser on computer 140, loads the home page of HTTP server 220 from which the user may manage signaling application 1130. For example, the user types in http://server.company.com/index.asp. HTTP server 220 then loads the corresponding page and sends it to client 140's interface as an HTML document.

In step 308, the web browser displays the home page on the display screen of computer system 140. Normally, the home page shows choices for the user to select and thus manage signaling application 1130. Examples of those choices include getting the trunk number, getting configurations of the system including the trunks, getting statistic of the system, of a particular trunk, getting help information, etc. For illustration purposes, the user clicks on the hyper-link for getting the configuration of the trunks, which will activate a dedicated script e.g., get_trunk_config.asp, on signaling application 1130. Clicking on the hyper-link, in effect, initiates an HTTP request for a command or set of commands desired by the user.

In step 312, the browser sends the HTTP request for getting the configuration of the trunk to HTTP server 220 along with program parameters as appropriate.

In step 316, HTTP server 220, upon receiving the request, analyzes it and determines that the requested file is the script get_trunk_config.asp, loads this script from disk, and invokes script engine 230 to interpret script get_trunk_config.asp along with parameters extracted from the HTTP request.

In step 320, script engine 230 interprets the loaded script get_trunk_config.asp. Because script get_trunk_config.asp has access to internal objects of signaling application 1130, script get_trunk_config.asp calls these objects, e.g., invoking C++ and/or Java methods, to get information and/or executes commands to change the objects.

In step 324, script engine 230, via script get_trunk_config.asp, formats the results, e.g., in HTML or XML, and adds them to the reply, which may also be a scriptable object.

In step 328, HTTP server 220 gets the result of the script and sends the reply to the web browser.

In step 332, the web browser loads and displays the requested information on the screen of computer 140. If the data is in XML, then the current HTML page on the client can itself analyze/parse the XML data to create and/or modify the corresponding HTML display.

In the above steps, scheduler 240 performs its function as appropriate. For example, scheduler 240, in step 316, invokes HTTP server 220 to read the request, and later to process the request, etc. In step 320, scheduler 240 the calls the script engine 230 to process the data, etc.

Embodiments of the invention can allow dynamically debugging of signaling application 1130 and/or voice portal application 110. For example, scripts can be provided to debug voice portal application 110 while this application is running and without stopping the application. Scripts can be modified without having to stop the application.

Signaling application 1130 and the voice portal solution in FIG. 1 are used as an example. Techniques of the invention are applicable in managing other applications that run on a system having access to a network and that are able to schedule a script engine and an application server such as the HTTP server. Generally, an application running on a computer and manipulating data exports its functions to access these application data via an API. The script engine built-in objects are enriched with dedicated objects encapsulating application data using the API. The server-side scripts are created to perform requests on these data. These scripts are executed in response to the remote client actions, and the client, in return, receives the response of the server script that ranges from a simple acknowledge to complex result tables. For example, signaling application 1130 may be used to manage a photo album wherein signaling application 1130 is replaced with an album managing application and the pictures are objects of the album application. The managing application exports methods to access and manipulate photos within the album. The script engine is enriched with album, photo, owner, objects, etc. The objects are interfaced to the application functions and are available at the scripting level. Server-side scripts are written to perform actions such as listing photos of the album, removing a photo, etc.

Computer System Overview

Figure 4:
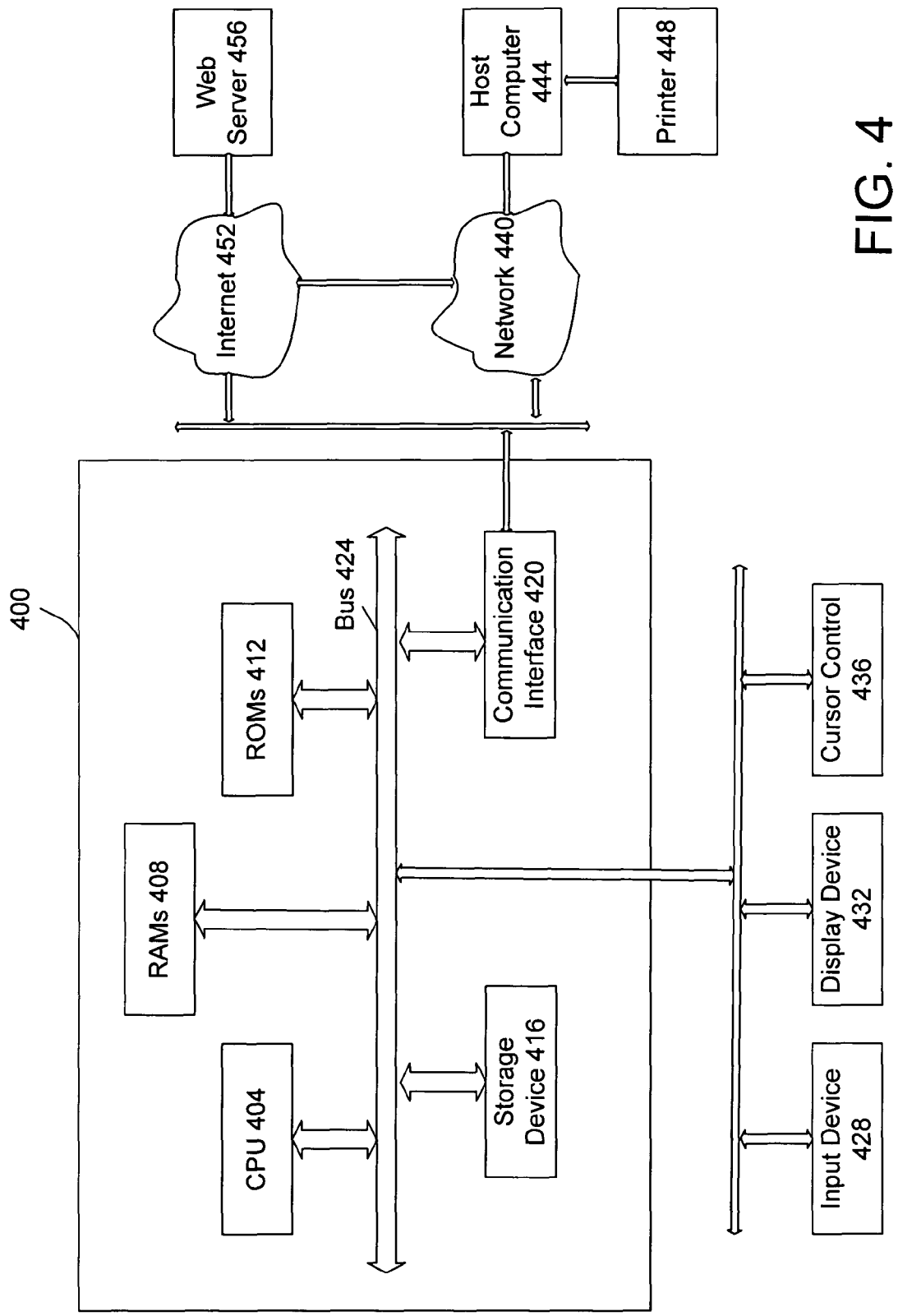
FIG. 4 shows a computer system upon which embodiments of the invention may be implemented.

FIG. 4 is a block diagram showing a computer system 400 upon which an embodiment of the invention may be implemented. For example, computer system 400 may be implemented to operate as a computer 140, to run voice portal application 110, to run signal application 1130, to perform functions in accordance with the techniques described above, etc. In an embodiment, computer system 400 includes a central processing unit (CPU) 404, random access memories (RAMs) 408, read-only memories (ROMs) 412, a storage device 416, and a communication interface 420, all of which are connected to a bus 424.

CPU 404 controls logic, processes information, and coordinates activities within computer system 400. In an embodiment, CPU 404 executes instructions stored in RAMs 408 and ROMs 412, by, for example, coordinating the movement of data from input device 428 to display device 432. CPU 404 may include one or a plurality of processors.

RAMs 408, usually being referred to as main memory, temporarily store information and instructions to be executed by CPU 404. Information in RAMs 408 may be obtained from input device 428 or generated by CPU 404 as part of the algorithmic processes required by the instructions that are executed by CPU 404.

ROMs 412 store information and instructions that, once written in a ROM chip, are read-only and are not modified or removed. In an embodiment, ROMs 412 store commands for configurations and initial operations of computer system 400.

Storage device 416, such as floppy disks, disk drives, or tape drives, durably stores information for use by computer system 400.

Communication interface 420 enables computer system 400 to interface with other computers or devices. Communication interface 420 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 420 may also allow wireless communications.

Bus 424 can be any communication mechanism for communicating information for use by computer system 400. In the example of FIG. 4, bus 424 is a media for transferring data between CPU 404, RAMs 408, ROMs 412, storage device 416, communication interface 420, etc.

Computer system 400 is typically coupled to an input device 428, a display device 432, and a cursor control 436. Input device 428, such as a keyboard including alphanumeric and other keys, communicates information and commands to CPU 404. Display device 432, such as a cathode ray tube (CRT), displays information to users of computer system 400. Cursor control 436, such as a mouse, a trackball, or cursor direction keys, communicates direction information and commands to CPU 404 and controls cursor movement on display device 432.

Computer system 400 may communicate with other computers or devices through one or more networks. For example, computer system 400, using communication interface 420, communicates through a network 440 to another computer 444 connected to a printer 448, or through the world wide web 452 to a server 456. The world wide web 452 is commonly referred to as the "Internet." Alternatively, computer system 400 may access the Internet 452 via network 440.

Computer system 400 may be used to implement the techniques described above. In various embodiments, CPU 404 performs the steps of the techniques by executing instructions brought to RAMs 408. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 404 may be stored in and/or carried through one or more computer-readable storage media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable transmission media may be coaxial cables, copper wire, fiber optics, acoustic or electromagnetic waves, capacitive or inductive coupling, etc. As an example, the instructions to be executed by CPU 404 are in the form of one or more software programs and are initially stored in a CD-ROM being interfaced with computer system 400 via bus 424. Computer system 400 loads these instructions in RAMs 408, executes some instructions, and sends some instructions via communication interface 420, a modem, and a telephone line to a network, e.g. network 440, the Internet 452, etc. A remote computer, receiving data through a network cable, executes the received instructions and sends the data to computer system 400 to be stored in storage device 416.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A method for managing a program application, comprising:
   embedding a script engine and an application server in the program application, thereby allowing the script engine and the application server to have access to program objects of the program application;
   wherein
   the script engine executes program scripts that include commands to manage the program objects;
   the application server handles management interactions from a client or management terminal external to the program application including invoking the script engine to execute the program scripts;
   the program application is part of a signaling stack that processes signaling applications;
   a scheduler, embedded in the program application, that schedules tasks to be performed by the application server, the script engine, and the application logic handling the program application; and
   via the application server and the script engine, managing the program objects responsive to the management interactions from the client or management terminal.

2. The method of claim 1 wherein the application server uses the hyper-text transfer protocol, and the management interactions are in one or a combination of the extensible markup language and the hyper text markup language.

3. The method of claim 1 wherein the management interactions are processed via a communication link between the program application and a computer system.

4. The method of claim 1 wherein the signaling stack is for use in a portal application.

5. The method of claim 1 wherein the scheduler gives the application logic higher priority than the application server and the script engine in using system resources shared by the application logic, the application server, and the script engine.

6. A system, comprising:
a computer system configured to execute program application, the program application having program objects;
a script engine and an application server embedded in the program application and thereby having access to the program objects;
a scheduler, embedded in the program application, that schedules tasks to be performed by the application server, the script engine, and the application logic handling the program application;
wherein
the program application is part of a signaling stack that processes signaling applications;
the script engine executes program scripts that include commands to manage the program objects; and
the application server is configured to receive management interactions from a client or management terminal external to the program application and is configured, responsive to the management interactions, to invoke the script engine to execute the program scripts to modify at least one of the objects data of these objects.

7. The system of claim 6 wherein the application server uses the hyper-text transfer protocol, and the management interactions are in one or a combination of the extensible markup language and the hyper-text markup language.

8. The system of claim 6 wherein the management interactions are via a communication link between the program application and a computer system.

9. The system of claim 6 wherein the signaling stack is for use in a portal application.

10. The system of claim 6 wherein the scheduler gives the application logic higher priority than the application server and the script engine in using system resources shared by the application logic, the application server, and the script engine.

11. A non-transitory computer-readable storage medium, comprising instructions executable by a computer, the instructions are for:
a program application having program objects;
a script engine and an application server, which are embedded in the program application and thereby have access to the program objects;
a scheduler, embedded in the program application, that schedules tasks to be performed by the application server, the script engine, and the application logic handling the program application;
wherein
the program application is part of a signaling stack that processes signaling applications;
the script engine executes program scripts that include commands to manage the program objects; and
the application server, in response to management interactions from a client or management terminal external to the program application, invoking the script engine to execute the program scripts.

12. The non-transitory computer-readable storage medium of claim 11 wherein the application server uses the hyper-text transfer protocol, and the management interactions are in one or a combination of the extensible markup language and the hypertext markup language.

13. The non-transitory computer-readable storage medium of claim 11 wherein the management interactions are via a communication link between the program application and a computer system.

14. The non-transitory computer-readable storage medium of claim 11 wherein the signaling stack is for use in a portal application.

15. The non-transitory computer-readable storage medium of claim 11 wherein the scheduler gives the application logic higher priority than the application server and the script engine in using system resources shared by the application logic, the application server, and the script engine.

* * * * *

UNITED STATES PATENT AND TRADEMARK OFFICE
CERTIFICATE OF CORRECTION

| | |
|---|---|
| PATENT NO. | : 7,974,990 B2 |
| APPLICATION NO. | : 10/621795 |
| DATED | : July 5, 2011 |
| INVENTOR(S) | : Abdessattar Sassi et al. |

It is certified that error appears in the above-identified patent and that said Letters Patent is hereby corrected as shown below:

In column 9, line 4, in Claim 6, delete "execute program" and insert -- execute a program --, therefor.

Signed and Sealed this
Twenty-fourth Day of July, 2012

David J. Kappos
*Director of the United States Patent and Trademark Office*